Dec. 16, 1969 K. SIUDA 3,484,754

CIRCUIT FOR SIGNALING INDIVIDUAL ALTERNATIONS OF BINARY INFORMATION

Filed Sept. 11, 1968

2 Sheets-Sheet 1

INVENTOR
KARL SIUDA

BY Brady, O'Boyle & Gates

ATTORNEYS

INVENTOR
KARL SIUDA
BY Brady, O'Boyle & Gates
ATTORNEYS

United States Patent Office 3,484,754

Patented Dec. 16, 1969

3,484,754

CIRCUIT FOR SIGNALLING INDIVIDUAL ALTERATIONS OF BINARY INFORMATION

Karl Siuda, Kirchlindach, Switzerland, assignor to Hasler AG, Bern, Switzerland, a Swiss corporation Continuation-in-part of application Ser. No. 466,476, June 23, 1965. This application Sept. 11, 1968, Ser. No. 758,949

Claims priority, application Switzerland, June 24, 1964, 8,158/64

Int. Cl. G11b 9/00; H04m 3/00

U.S. Cl. 340—173 1 Claim

ABSTRACT OF THE DISCLOSURE

A circuit for signaling individual alterations of binary information received from a plurality of information sources. This circuit has storing means, storing therein the information of each source individually, and comparing means. The last transmitted information and the previously transmitted and stored information of all information sources of one group are compared simultaneously. If the compared informations of at least one of the information sources of the group differ, the last transmitted and the previously transmitted and stored information of the individual information sources of the group are compared one after the other until one information source whose compared informations differ by the predetermined distinction has been found. Thereupon a signal characterizing this information source is produced. Thereafter, the last transmitted information and the previously transmitted and stored information of all information sources of the next group of information sources are compared in the same manner.

CROSS-REFERENCE TO RELATED APPLICATION

This application constitutes a continuation-in-part of my copending application, Ser. No. 466,476 for "Method for Signaling Individual Alterations of Binary Information," filed June 23, 1965, now abandoned.

FIELD OF THE INVENTION

Automatic exchanges are one application of the circuit of the invention. In this application, each subscriber's telephone set is an information source. The binary information indicates whether the subscriber's line circuit is open or closed. If for instance the subscriber's line circuit is closed according to a last information and was open acording to a previously transmitted information, a signal appears and initiates switching operations as required for receiving the subscriber's dialing information.

Another application is the signaling of individual alterations of the positions of a considerable number of contacts of control or supervision devices in supply networks for electricity, gas, water, oil, etc., traffic systems, or industrial plants of any kind. Generally speaking, the invention is applicable to the supervision of the states of a great number of devices and to control purposes.

It will be noted that more than two states of a device can be binary coded and then alterations may be signaled with the circuit of the invention.

DESCRIPTION OF THE PRIOR ART

Hitherto the subscriber's lines have been scanned one after the other. The scanning frequency becomes very high if a considerable number of subscriber's lines is to be scanned within a limited time.

SUMMARY OF THE INVENTION

It is an object of the invention to provide a circuit enabling the scanning of a considerable number of sources of binary information, e.g., subscriber's lines, within a shorter time and/or using a lower scanning frequency.

With the circuit of the invention, the last transmitted information of one group of information sources is simultaneously compared with previously transmitted and stored information of this group and a signal is produced if the compared informations of at least one of the information sources of the group differ by a predetermined distinction. On such signal said informations of individual information sources of the group are compared one after the other until one information source whose compared informations differ by the predetermined distinction has been found. Thereupon, a signal characterizing this information source is delivered and the process is continued by simultaneous comparison of both informations of all information sources of the next group. These steps are carried out automatically by electronic circuit means.

The usefulness of this procedure is based on the following reasons: Assuming for instance a telephone exchange for 10,000 subscribers and 18,000 calls per hour during the busy period, than only five subscribers will unhook during one second. Then, the probability for the corresponding alteration of the state of a certain subscriber's line within one second amounts to 0.0005.

When the subscriber's lines are arranged in groups, each comprising 16 subscriber's lines, then the probability for this alteration of the state of one subscriber's line in one group within one second will be 0.008. Consequently, when checking the state of 125 groups, only one subsubscriber's line will be found which has correspondingly altered its state during the last second.

DESCRIPTION OF THE PREFERRED EMBODIMENT

Figure 1:
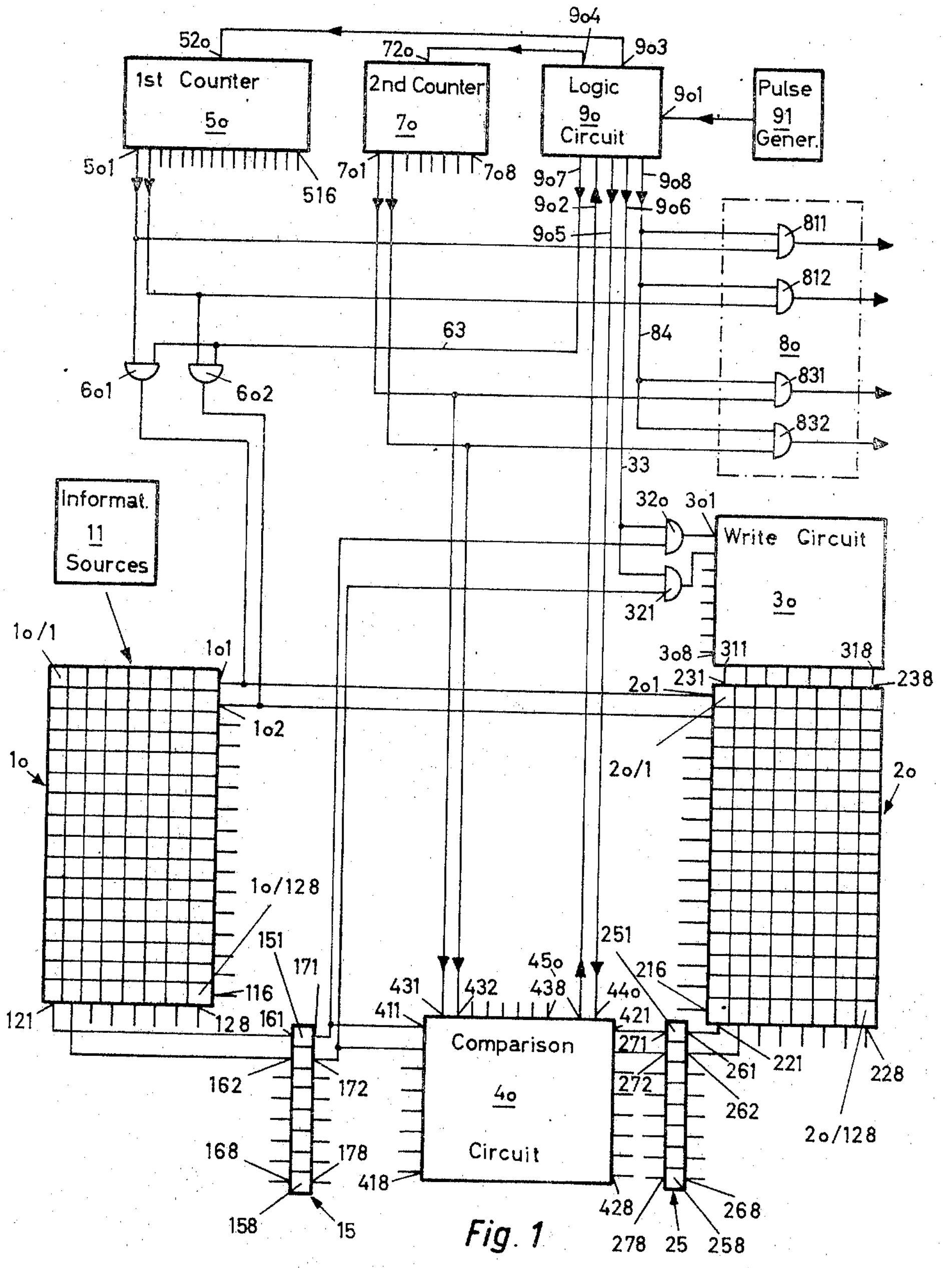
FIG. 1 is a block diagram showing a circuit according to the invention.

The circuit of FIG. 1 includes a plurality of binary information sources 11, alterations of the information therein are to be signalled. Such information sources are e.g. telephone subscriber's sets, the binary information consists in the actual condition of the set, i.e., on-hook or off-hook. By the circuit shown in FIG. 1, any change of this condition is signalled and the subscriber's set which has changed its condition is indicated.

Each of the signal sources 11, e.g. subscriber's lines, is connected with a binary element 10/1 . . . 10/128 of a matrix 10. The elements are arranged in $m$ lines and $n$ columns so that $m \cdot n$ is the quantity of information sources. In the drawing it is assumed $m=16$, $n=8$. Each line has a read wire 101 . . . 116. Each column has a sense wire 121 . . . 128 resp. connected with the input 161 . . . 168 resp. of one stage 151 . . . 158 resp. of a first $n$-stage register 15.

On a pulse on any one of the read wires 101 . . . 116 the states of the elements of the corresponding line are read and pulses arise on the sense wires 121 . . . 128 depending on the states of the elements of this line and therefore on the states of the corresponding information sources.

A storage matrix 20 contains $m \cdot n$ elements 20/1 . . . 20/128 arranged in the same manner as the elements of the matrix 10. Each line has a read wire 201 . . . 216 resp. connected to the corresponding read wire 101 . . . 116 resp. of the matrix 10. Each column has one write wire 231 . . . 238 resp. and one sense wire 221 . . . 228 resp. Each sense wire 221 . . . 228 resp. is connected with the input 261 . . . 268 resp. of one stage 251 . . . 258 resp. of a second *n*-stage register 25.

A write circuit 30 has *n* inputs 301 . . . 308 and *n* outputs 311 . . . 318. Each of these outputs is connected to one of the write wires 231 . . . 238.

On a pulse on any one of the read wires 200 . . . 216 the states of the storage elements of the corresponding line are read and pulses arises on the sense wires 220–228 depending on the states of the storage elements of this line. A subsequent pulse combination on inputs 301 . . . 308 causes a corresponding combination to be stored in the elements of the line that just has been read.

Each of the inputs 301 . . . 308 is connected to the output of one of *n* AND-gates only two of which are shown and designated by 320 and 321, each AND-gates has two inputs. One of them is connected to the corresponding one of the outputs 171 . . . 178 of the first register 15. The other input of all these AND-gates are connected to a first control line 33.

A comparison circuit 40 has *n* first inputs 411 . . . 418 connected to the outputs 171 . . . 178 of the first *n*-stage register 15, and *n* second inputs 421 . . . 428 connected to the outputs 271 . . . 278 of the second *n*-stage register 25, *n* further inputs 431 . . . 438, a control input 440 and an output 450.

This circuit 40 compares in dependence on the state of the control input 440 simultaneously or successively the states of corresponding stages of the registers 15 and 25. The successive comparison is controlled by pulses supplied successively to the inputs 431 . . . 438 and each indicating one pair of corresponding stages 151 and 251, 152 and 252 etc. A signal is produced on output 450 in dependence on the result of the comparison.

If the states of two corresponding stages 151 and 251, 152 and 252 . . . 158 and 258 resp. are different, they may be "0" and "1" or "1" and "0." The signal on output 450 can be produced at option in the first or second or both of these cases.

A first counter 50 has *m* outputs 501 . . . 516 and one advance input 520. This counter is advanced one step on every pulse on input 520 and energizes one of outputs 501 . . . 516 after the other in a cyclic manner.

*m* AND-gates 601, 602 etc. have two inputs and one output each. Only two of these gates are shown. One input of each gate 601, 602 etc. is connected to a corresponding output 501 . . . 516 of counter 50. The other input of all gates 601, 602 etc. is connected to a second control line 63. The output of each gate 601, 602 etc. is connected to the corresponding read wires 101 and 201, 102 and 202 etc.

A second counter 70 has *n* outputs 701 . . . 708 and one advance input 720. This second counter operates in a manner corresponding to that of the first counter 50. Each of the outputs 701 . . . 708 is connected to a corresponding of the inputs 431 . . . 438 of the comparison circuit 40.

An output circuit 80 includes *m* AND-gates 811, 812 etc. and *n* AND-gates 831, 832 etc. Only two of said *m* gates and two of said *n* gates are shown. Each of said *m* and *n* gates has two inputs and one output. One input of the *m* gates 811, 812 etc. is connected to the corresponding one of the *m* outputs 501, 502 etc. of the first counter 50. One input of the *n* gates 831, 832 etc. is connected to the corresponding one of the *n* outputs 701, 702 etc. of the second counter 70. The other input of the *m* and *n* gates 811, 812 etc. and 831, 832 etc. is connected to a third control line 84. The outputs of these $m+n$ gates constitutes the outputs of the circuit for signaling individual alterations of the binary information sources 11 and are connected to an external receiver (not shown). The output of each of the *m* gates 811, 812 etc. corresponds to one line of the matrix 10 and the out-put of each of the *n* gates 831, 832 etc. corresponds to one column of the matrix 10.

A logic circuit 90 has a first input 901 supplied with pulses from a pulse generator 91, a second input 902 connected to the output 450 of the comparison circuit 40, a first output 903 connected to the input 520 of the first counter 50, a second output 904 connected to the input 720 of the second counter 70, a third output 905 connected to the control input 440 of the comparison circuit 40 and a fourth, fifth and sixth output 906, 907 and 908 resp. connected the first, second, and third control line 63, 84 and 33 resp.

The logic circuit receives on input 901 a cyclic sequence of pulses from the pulse generator 91. Under the control of pulses appearing on output 450 of the comparison circuit 40 and supplied to input 902 of the logic circuit 90, this circuit supplies pulses on outputs 903, 907, 906 and 904 and 908 resp. and supplies a permanent signal on output 905 as described below.

The circuit operates in three different cyclic sequences illustrated by the flow-chart FIG. 21.

In a first step of the first sequence, the counter 50 is advanced one step by a pulse on its advance input 520.

In a second step a pulse from output 907 of the logic circuit 90 goes to the gates 601, 602, etc., passes that gate determined by the position of counter 50, and goes to the corresponding read wire 101 . . . 116 resp. of the matrix 10 and 201 . . . 216 resp. of the storage matrix 20. The binary elements on these read wires are now read simultaneously and transferred to register 15 and 25 resp. The states of these elements of the matrix 10 correspond to the states of the information sources 11 assigned to them.

In a third step of the first sequence a pulse from output 906 of the logic circuit opens the gates 320, 321, etc. and transfers the states of the outputs 171 . . . 178 of the first register 15 to the inputs 301 . . . 308 of the write circuit 30. This circuit causes said states to be written into the line of the storage matrix 20 that just has been excited by the read wire. Thereby these states are stored to be used later as "previous states." The comparison circuit compares simultaneously the states of corresponding outputs 171 and 271, 172 and 272 etc. of the first and second register 15 and 25 and in this way the state of each information source with the state of the same source at the time of the last comparison. A pulse on output 450 indicates an alteration of the states of at least one of the information sources assigned to the respective line.

Figure 2:
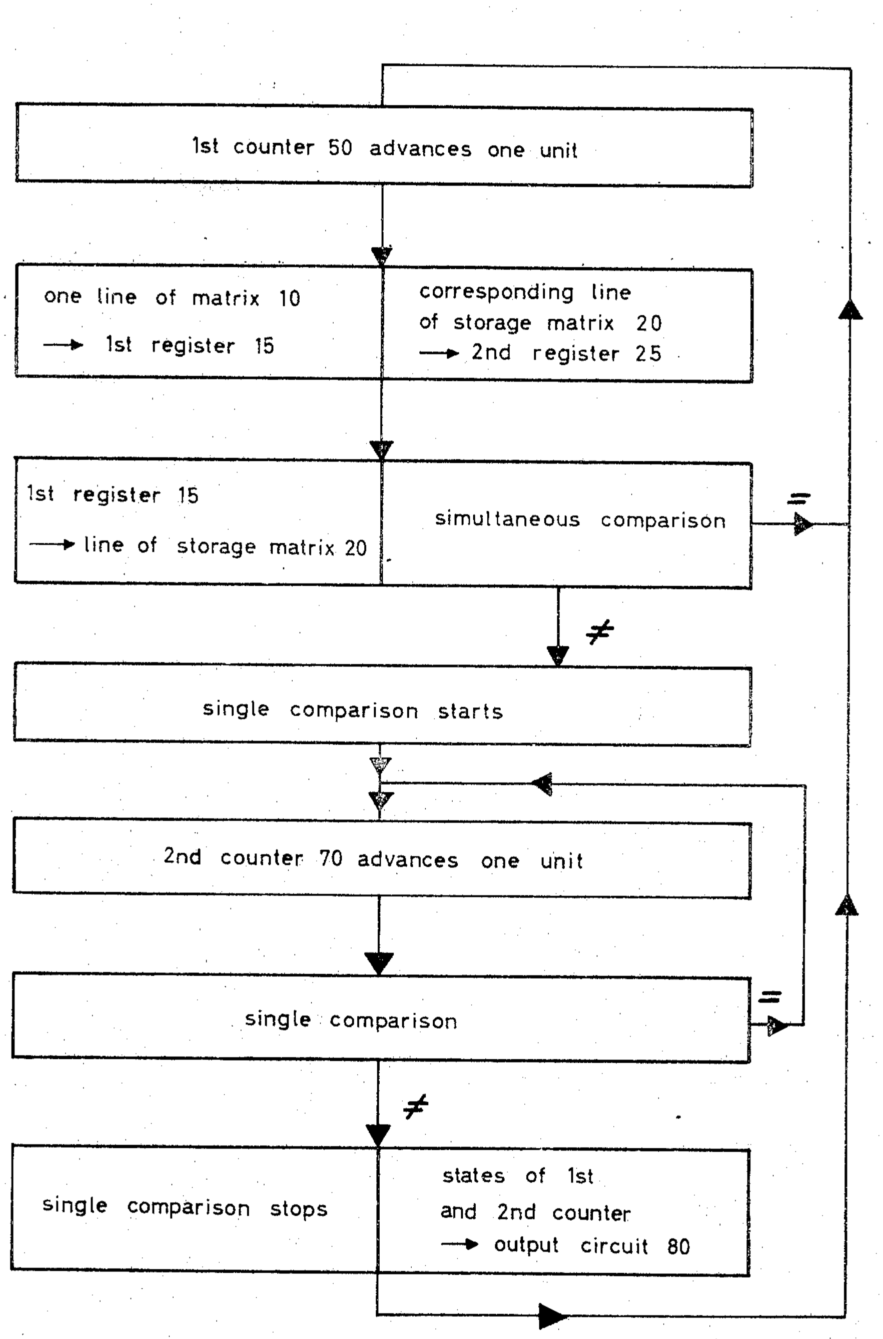
FIG. 2 is a flow chart illustrating the function of the circuit shown in FIG. 1.

If no alteration is indicated (denoted by "=" in FIG. 2), i.e. if no pulse appears on output 450, the logic circuit 90 causes a cyclic repetition of the first, second and third step until an alteration is indicated (denoted by "≠" in FIG. 2) by a pulse appearing on output 450.

Now, in a second sequence it must be found out on which information source this alteration occurred. For doing so, the logic circuit 90 emits on output 905 a permanent signal to the input 440 of the comparison circuit 40 causing single comparison of the states of that pair of corresponding states of the first and second registers 15 and 25 which is determined by the position of counter 70 by a signal on one of the inputs 431 . . . 438. Counter 70 is advanced stepwise until a pair of unequal states has been found, which result is signaled by a pulse on output 450. Such a pair is present because an inequality indication occurred during the first sequence.

Now the counter 70 stops and in the third sequence the logic circuit 90 supplies a pulse to control line 84. Thereby the output of two gates of the output circuit 80 is excited, one of these gates corresponds to the state of counter 50 and the other corresponds to the state of counter 70, so that these two outputs indicate the column and line of the element of matrix 10 and the corresponding information source which has altered its state. Thereupon the permanent signal on output 905 of the logic circuit 90 ceases.

Now, the first sequence begins again.

What is claimed is:

1. Circuit for signaling individual alterations of binary information received from a plurality of information sources (11), comprising a matrix (10), having a plurality of binary elements (10/1 . . . 10/128) arranged in *m* lines and *n* columns, the state of each of said elements being dependent on the state of one of said information sources, a read wire (101 . . . 116) in each of said lines of said matrix (10) and a sense wire (121 . . . 128) in each of said columns of said matrix (10), a first register (15) having *n* stages (151 . . . 158), each with one input (161 . . . 168) connected with one of said sense wires (121 to 128) and one output (171 . . . 178), a storage matrix (20) having a plurality of elements (20/1 . . . 20/128) arranged in *m* lines and *n* columns, a read wire (201 . . . 216) in each of said lines of said storage matrix (20) and a write wire (231 . . . 238) and a sense wire (221 . . . 228) in each of said columns of said storage matrix (20), a second register (25) having *n* stages (251 . . . 258) each with one input (261 . . . 268) connected to one of said sense wires (221 to 228) of said storage matrix (20), a write circuit (30) having *n* inputs (301 . . . 308) and *n* outputs (311 . . . 318), each of said outputs being connected to one of said write wires (231 . . . 238),

*n* AND-gates (320, 321 etc.) each having two inputs and one output, one input of each of said *n* AND-gates being connected to one of the outputs (171 . . . 178) of said first register (10), and the other input of said AND-gates are connected to a common first control line (33), and the output of each of said AND-gates is connected to one of the inputs (301 . . . 308) of said write circuit (30), a comparison circuit (40) having a control input (440) and comparing in dependence on the state of said control input either simultaneously or successively the states of corresponding stages (151 and 251, 158 and 258 etc.) of said first and second register (15 and 25), and having *n* further inputs (431 . . . 438) adapted to receive one of *n* selection signals indicating one pair of register stages, the states of which are to be compared, and one output (450), a first counter (50) for *m* states and having one advance input (520) and *m* outputs (501 . . . 416),

*m* AND-gates (601, 602 etc.) each having two inputs, one connected to one of said outputs (501 . . . 516) of said first counter (50) and the other connected to a second control line (63), and an output connected to one of said read lines (101 . . . 116 resp.) of said matrix (10) and to the corresponding read line (201 . . . 216 resp.) of said storage matrix (20), a second counter (70) for *n* states and having one advance input (720) and *n* outputs (701 . . . 708) each connected to one of said *n* further inputs (431 . . . 438) of said comparison circuit (40), an output circuit (80) having $m+n$ AND-gates (811, 812 etc. and 831, 832 etc.), each having two inputs, one of them being connected to a common third control line (84) and the other being connected to a separate one of said m outputs (501 . . . 516) of said first counter (50) and said *n* outputs (701 . . . 708) of said second counter (670), a pulse generator (91) and a logic circuit (90) having a first input (901) connected to said pulse generator (91), a second input (902) connected to said output (450) of said comparison circuit (40), a first and a second output (903, 904) connected to said advance input (520, 720) of said first and said second counter (50 and 70) resp., a third output (905) connected to said control input (440) of said comparison circuit (40), a fourth, a fifth and a sixth output (906, 907, 908) connected to said first, second and third control line (63, 84, 33) resp.

said logic circuit delivering a cyclic sequence of pulses appearing alternatively on its first, fourth and sixth output (903, 906, 908) as long as no pulse appears on its second input (902), and delivering on a pulse on its second input (902) a sequence of pulse on its second output (904) and a permanent signal on its third output (905) until a further pulse appears on its second input (902), and delivering on said further pulse apeparing on its second input (902) one pulse on its fifth output (907) and beginning thereupon again with said cyclic sequence.

References Cited

UNITED STATES PATENTS 3,293,370 12/1966 Macleod.

TERRELL W. FEARS, Primary Examiner

U.S. Cl. X.R.

179—18